Patented Apr. 14, 1936

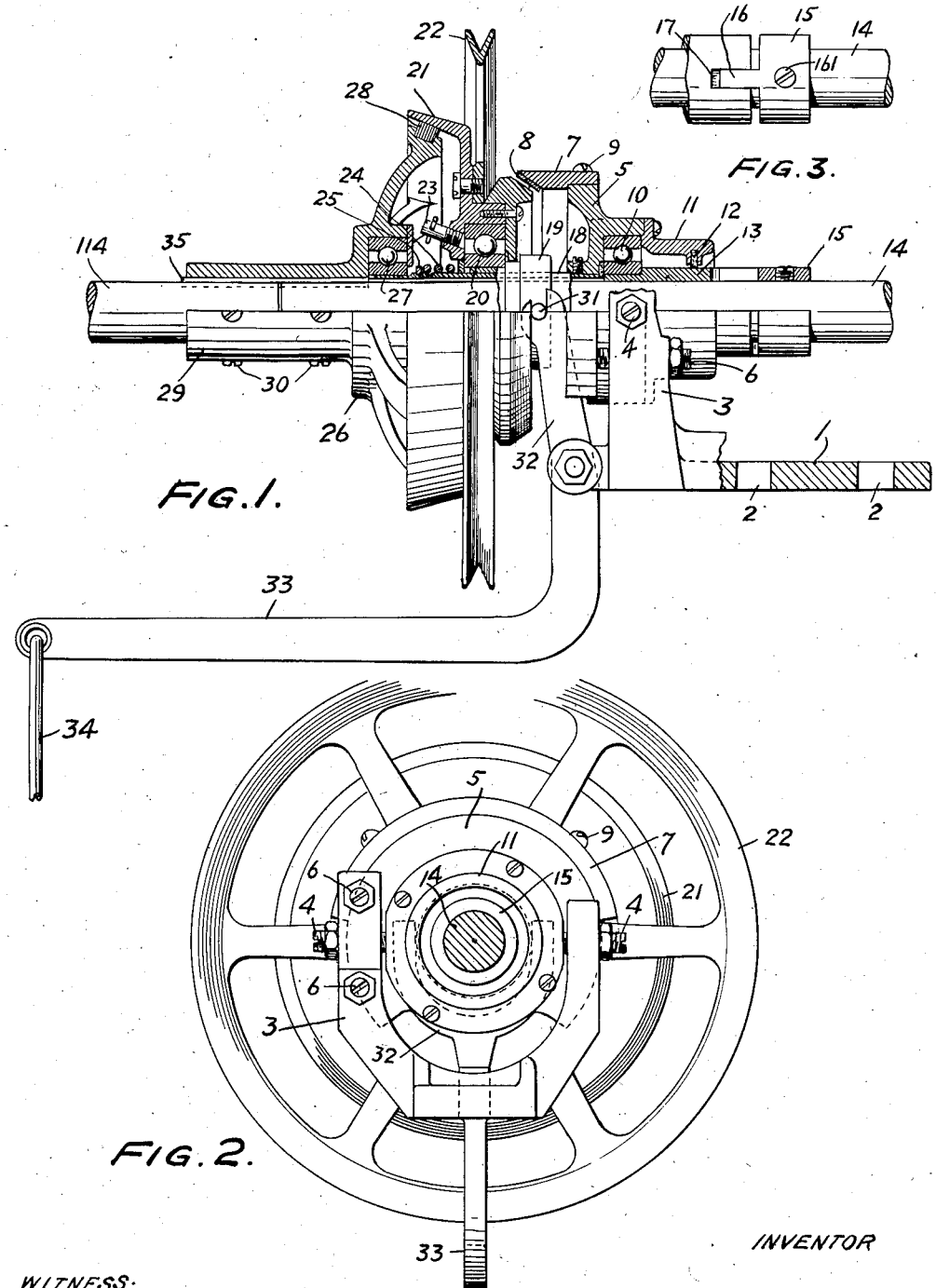

2,037,643

UNITED STATES PATENT OFFICE 2,037,643

MULTIPLE DRIVE TRANSMISSION UNIT

Max T. Voigt, Reading, Pa., assignor to American Safety Table Company, Reading, Pa., a corporation of Pennsylvania Application July 19, 1934, Serial No. 735,975

5 Claims. (Cl. 192—18)

The object of my invention is to provide an improved and simplified multiple drive transmission unit, consisting of a shaft made up of a number of sections, a bracket, a stationary clutch element pivotally mounted in said bracket and forming a support for said shaft, a tube mounted in said stationary element, a movable clutch element mounted on said tube, a wheel fastened to said shaft and rotatable therewith, means for moving said movable element into contact with said wheel or with said stationary element. This transmission unit is particularly useful in connection with sewing machines mounted on tables having a line shaft passing beneath them.

One feature of my invention are screws passing through said bracket and bearing on said stationary clutch element, to rigidly retain said stationary clutch element in adjusted position relative to said bracket after the shaft has been aligned.

Another feature of my invention consists in the provision of a brake on the stationary clutch element adapted to co-operate with the movable clutch element and mounted on a flange of such shape and detachably secured to the stationary clutch element so that the brake can be removed and replaced without re-aligning the shaft.

Another feature of my invention consists in the provision of a spring surrounding the tube and stressing the movable clutch element into contact with the brake, and means co-operating with the tube for adjusting the tension of said spring.

Another feature of my invention consists in the provision of an elongated boss on the wheel mounted on the shaft, and screws or other fastening means passing through said boss and co-operating with sections of said shaft to connect said sections together.

Yet another feature of my invention consists in the provision of a ring mounted in a bearing in said stationary clutch element and receiving said shaft therein so that said shaft is free to rotate or to slide axially in said ring, and a connecting element fast on said shaft and having sliding engagement with said ring so that said ring rotates with said shaft but said shaft and said connecting element are free to slide axially in said ring.

Other features of my invention will be readily apparent to those skilled in the art. I do not intend to limit myself to the foregoing features of invention, but intend to claim all the novel features possessed by my device as set forth in the annexed drawing and specification and called for by the appended claims.

In the drawing:

Fig. 1 is a side elevation of my device, with parts broken away in vertical cross-section.

Fig. 2 is an end view of my device, with parts broken away.

Fig. 3 is a detailed top plan view of the shaft and the connecting elements thereon.

In that embodiment of my invention chosen for illustration in the drawing, my device is shown as consisting of a support 1, adapted to be located on a sewing machine bench, or other convenient location, and having holes 2 passing therethrough, through which connecting means may be passed. Support 1 carries a bracket or yoke 3 thereon, through which pass pins 4. Pivotally mounted on pins 4 is a stationary clutch element 5. Through the bracket 3 pass a pair of bolts 6, which bear, at their inner ends, on stationary element 5, and thus secure the stationary element in position relative to the support after the shaft has been properly aligned.

Stationary clutch element 5 has a flange 7 on its upper surface, to which is secured a brake lining 8 of leather or similar flexible material. Flange 7 is of horse-shoe or curved shape, and is secured to the stationary clutch element 5 by fastening means 9 in such a way that flange 7 may be readily detached and brake lining 8 repaired or renewed without disturbing the alignment of the shaft hereafter mentioned.

Stationary clutch element 5 also carries a bearing 10 in it, which is covered by a guard 11 having a felt or like dust-proof device 12. In the inner race of bearing 10 is mounted a ring or bearing element 13, through which passes a shaft 14 which is free to rotate or to slide axially in ring 13. On shaft 14 is fixedly secured a connecting element 15, as by a screw 161. Connecting element 15 has one or more projecting tongues 16 adapted to be received in grooves 17 in ring 13, so that ring 13 rotates with shaft 14, but connecting element 15 and shaft 14 are free to slide axially in ring 13 and consequently in stationary clutch element 5 which supports ring 13.

Also mounted in stationary clutch element 5 is a tube 18, which surrounds, but is spaced from, a portion of shaft 14. Tube 18 carries, on its outer surface, a sleeve 19 on which is mounted a bearing 20, which, in turn, supports a movable clutch element 21, to which is secured a pulley 22 and a grease fitting 23 for bearing 20. A spring 24 stresses movable clutch element 21, and the parts connected thereto, into contact with the brake lining 8. A ring 25 takes the stress of the opposite end of spring 24 and co-operates with tube 18. Ring 25 is adjustable in one of several slots provided in tube 18, and thus provides means for adjusting the tension of spring 25.

Fast on shaft 14 is a wheel 26 having a bearing 27 therein which bears on tube 18, so that tube 18 forms a guide or axle for wheel 26 and for shaft 14 supported thereby. Wheel 26 has, at its outer surface, a facing 28, of leather or similar flexible material, adapted to engage movable clutch element 21. Wheel 26 has an elongated boss or hub 29, through which pass a plurality of screws or similar fastening means 30. Shaft 14 is composed of a number of sections, of which two (14 and 114) are shown. Hub 29 surrounds the parting between these two sections, and, by means of screws 30 and key 35, the sections are fastened together.

Sleeve 19 carries pins 31 in its sides which are received in a yoke 32 integral with lever 33 to which is attached a link 34, from which the lever and the parts connected thereto are operated by means of a foot treadle or other device (not shown).

In operation, the shaft 14—114 is a line shaft and is ordinarily rotating. Spring 24 ordinarily stresses movable clutch element 21 into contact with brake lining 8, so that the pulley 22 and the sewing machine or similar device which is connected thereto by means of a belt (not shown) is at rest. When it is desired to operate the sewing machine or other device, the treadle connected to link 34 is depressed. The lever 33 moves yoke 32, pins 31, sleeve 19, and movable clutch element 21, so that movable clutch element 21 contacts the facing 28 on wheel 26 which rotates with shaft 14—114, thereby causing rotation of the movable clutch element and pulley 22. When the treadle is released, spring 24 returns the movable clutch element 21 into contact with brake lining 8, so that the rotation of pulley 22 is rapidly but gently checked.

I do not intend to be limited save as the scope of the prior art and of the attached claims may require.

I claim:

1. A multiple drive transmission unit comprising, in combination, a shaft formed in sections, a bracket mounted adjacent said shaft, a stationary element pivotally mounted on said bracket, means for rigidly securing said stationary element in adjusted position relative to said bracket and to said shaft, a tube mounted on said stationary element and spaced from said shaft, a movable clutch element mounted on said tube, a pulley attached to said movable element, a wheel fixed on said shaft for cooperation with said movable element, a hub on said wheel fastened to sections of said shaft to secure them together, a brake flange on said stationary element, means securing said brake flange to said stationary element so that said brake flange is removable without disturbing said shaft, a spring stressing said movable element into contact with said brake flange, means for adjusting the tension of said spring, a ring axially slidable on said shaft and rotatably mounted in said stationary element so as to form a support for said shaft, and a connecting element fast on said shaft and having engagement with said ring providing for longitudinal movement of said shaft.

2. In a multiple drive transmission unit having a shaft formed in sections, a stationary element forming a support for said shaft, and a movable clutch element mounted on said stationary element, the combination of, a wheel mounted on said shaft for rotation therewith and for cooperation with said movable element, a hub on said wheel, and means securing said hub to different sections of said shaft so that said sections are connected together.

3. In a multiple drive transmission unit, the combination of, a shaft, a stationary element forming a support for said shaft, a bearing element mounted in said stationary element and supporting said shaft so that said shaft is free for axial movement, and a connecting element fast on said shaft and having sliding engagement with said bearing element so that said bearing element and said connecting element and said shaft rotate together but said connecting element and said shaft are free for axial movement relative to said stationary element.

4. In a multiple drive transmission unit, the combination of, a shaft, a stationary element supporting said shaft, a tube mounted on said stationary element and surrounding but spaced from a portion of said shaft, a movable clutch element mounted on said tube, a wheel fast on said shaft and adapted to contact said movable element in one position of said movable element, a spring stressing said movable element out of contact with said wheel, adjustable means at the opposite end of said tube from said stationary element and co-operating with said tube for controlling the tension of said spring, and a bearing between said tube and said wheel.

5. In a multiple drive transmission unit, the combination of, a shaft, a stationary element supporting said shaft, a tube mounted on said stationary element and surrounding but spaced from a portion of said shaft, a movable clutch element mounted on said tube, a wheel fast on said shaft and adapted to contact said movable element in one position of said movable element, a spring stressing said movable element out of contact with said wheel, and a bearing provided between said tube and said wheel whereby said wheel is maintained in position on said shaft and opposite said stationary element.

MAX T. VOIGT.